(12) United States Patent
Griffin et al.

(10) Patent No.: US 12,223,342 B2
(45) Date of Patent: Feb. 11, 2025

(54) DYNAMICALLY SWITCHING A SOFTWARE SERVICE BETWEEN STATEFUL MODE AND STATELESS MODE

(71) Applicant: RED HAT, INC., Raleigh, NC (US)

(72) Inventors: Leigh Griffin, Waterford (IE); Anthony Carroll, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 659 days.

(21) Appl. No.: 17/478,151

(22) Filed: Sep. 17, 2021

(65) Prior Publication Data

US 2023/0088364 A1    Mar. 23, 2023

(51) Int. Cl.
  *G06F 9/46*  (2006.01)
  *G06F 3/06*  (2006.01)
  *G06F 9/50*  (2006.01)

(52) U.S. Cl.
  CPC ............ *G06F 9/461* (2013.01); *G06F 3/0604* (2013.01); *G06F 3/0631* (2013.01); *G06F 3/0644* (2013.01); *G06F 3/0673* (2013.01); *G06F 9/5011* (2013.01)

(58) Field of Classification Search
  CPC ....................................................... G06F 9/461
  USPC ........................................................ 718/104
  See application file for complete search history.

(56) References Cited

U.S. PATENT DOCUMENTS

| | | | | |
|---|---|---|---|---|
| 7,676,538 B2* | 3/2010 | Potter | ...................... | G06F 9/466 |
| | | | | 709/200 |
| 7,870,265 B2* | 1/2011 | Kramer | ................... | H04L 67/14 |
| | | | | 709/227 |
| 7,881,215 B1* | 2/2011 | Daigle | .................. | H04L 67/142 |
| | | | | 709/224 |
| 8,204,856 B2* | 6/2012 | Meyer | ................... | G06F 16/972 |
| | | | | 707/623 |
| 9,270,774 B2* | 2/2016 | Jalan | ...................... | H04L 67/142 |
| 9,749,387 B2* | 8/2017 | Chadzelek | ............ | H04L 67/142 |
| 10,389,611 B2* | 8/2019 | Szabo | ..................... | H04L 47/32 |
| 10,558,586 B1* | 2/2020 | Paterra | ................ | G06F 12/1408 |
| 11,314,546 B2* | 4/2022 | Saxena | ..................... | G06F 9/48 |
| 2005/0041592 A1* | 2/2005 | Hannel | ................. | H04L 41/145 |
| | | | | 370/241 |

(Continued)

OTHER PUBLICATIONS

Mehndiratta, H., "Kubernetes Storage Architecture Challenges and Solutions," Nov. 27, 2020, https://kubevious.io/blog/post/kubernetes-storage-architecture-challenges-and-solutions.

(Continued)

*Primary Examiner* — Mehran Kamran
(74) *Attorney, Agent, or Firm* — Kilpatrick Townsend & Stockton LLP (57) ABSTRACT

A software service can be dynamically switched between a stateless mode and a stateful mode in accordance with some examples described herein. For example, a system can detect an event associated with transitioning a software service from a stateless mode to a stateful mode. In response to detecting the event, the system can execute an allocation module for causing a persistent volume to be allocated to the software service. In response to detecting the event, the system can also execute a switching module for causing the software service to switch from (i) the stateless mode in which state information is not stored in the persistent volume to (ii) the stateful mode in which the state information is stored in the persistent volume.

20 Claims, 4 Drawing Sheets

(56) References Cited

U.S. PATENT DOCUMENTS

| | | | |
|---|---|---|---|
| 2005/0066060 A1* | 3/2005 | Pinkerton | H04L 69/10 709/249 |
| 2007/0198604 A1* | 8/2007 | Okada | G06F 16/972 |
| 2009/0006539 A1* | 1/2009 | Degenkolb | H04L 67/568 709/203 |
| 2011/0040826 A1* | 2/2011 | Chadzelek | H04L 67/142 709/203 |
| 2011/0145324 A1* | 6/2011 | Reinart | H04L 67/5651 709/206 |
| 2013/0100958 A1* | 4/2013 | Jalan | H04L 67/142 370/401 |
| 2013/0290607 A1* | 10/2013 | Chang | G06F 9/3842 711/144 |
| 2013/0318542 A1* | 11/2013 | Zamora | H04L 69/321 719/313 |
| 2017/0201444 A1* | 7/2017 | Szabo | H04L 43/0876 |
| 2018/0232181 A1* | 8/2018 | Zhou | G06F 3/0604 |
| 2018/0267785 A1* | 9/2018 | Holman | G06F 9/5072 |
| 2019/0149518 A1* | 5/2019 | Sevinc | H04L 63/0263 726/11 |
| 2019/0332308 A1* | 10/2019 | Feng | G06F 3/0604 |
| 2020/0034169 A1* | 1/2020 | Deore | G06F 9/45558 |
| 2021/0011811 A1* | 1/2021 | Balcha | G06F 11/1456 |
| 2021/0234925 A1* | 7/2021 | Cook | H04L 67/02 |
| 2021/0382632 A1* | 12/2021 | Dontu | H04L 67/1095 |
| 2023/0088364 A1* | 3/2023 | Griffin | G06F 9/461 718/104 |

OTHER PUBLICATIONS

"Containerizing Key Business Workloads: Evaluating the Approaches to Meet Persistent Storage Demands in Containers," Download from Internet Aug. 6, 2021, https://www.purestorage.com/resources/type-a/containerizing-business-workloads.html.

* cited by examiner

DYNAMICALLY SWITCHING A SOFTWARE SERVICE BETWEEN STATEFUL MODE AND STATELESS MODE

TECHNICAL FIELD

The present disclosure relates generally to executing computing operations on computing systems. More specifically, but not by way of limitation, this disclosure relates to dynamically switching a software service between a stateful mode and a stateless mode.

BACKGROUND

Computing clusters can execute software services for providing services to users. Some software services are designed to be stateful and other software services are designed to be stateless. Stateful services are allocated storage on the server side for storing state information for the duration of a user session. The state information can include information that preserves the state, or context, of the user session. Stateful services may depend on previous user interactions with the application to maintain context for a user of the software service on the server side for the duration of the session. In contrast, stateless services may not store state information from previous operations on the server side. Each operation may be executed on the server side without the use of any previously stored state information relating to previous operations. Stateful services and stateless services each have their own pros and cons. For example, stateless software services may perform operations faster than stateful services, but also may be unable to perform certain operations that require continuity of state on the server side.

DETAILED DESCRIPTION

Some software services may execute be stateful while other software services may be stateless. The developer of a particular software service typically decides whether the software service is to be stateful or stateless, based on the pros and cons of each and the intended functionality of the software service, and programs the software service accordingly. Once a software service has been programmed to be stateful or stateless and deployed into operation, that decision is relatively fixed and cannot be easily changed. For example, to change a software service from stateless to stateful, the developer may need to make significant updates to the program code (e.g., source code) for the software service. A system administrator may then need to shutdown the running version of the software service and deploy the new version, which may result in downtime or latency. This inflexibility can also lead to performance problems with the software service. Additionally, the needs of the system, the software service, or its users may change over time, but this rigidity may prevent the software service from accounting for those changes. As a result, the software service may provide suboptimal performance to its users because the software service cannot easily accommodate dynamically changing needs.

Some examples of the present disclosure can overcome one or more of the abovementioned problems via a stateful enabler service for switching (e.g., dynamically) a software service from a stateful mode to a stateless mode, or vice versa, while the software service is running. For example, a software service can be preprogrammed with both a stateful mode and a stateless mode. The software service can be capable of dynamically switching between the two modes. The stateful enabler service can execute a first process to switch the software service from the stateless mode to the stateful mode, for example in response to detecting an event. The first process can involve dynamically allocating non-volatile storage, such as a persistent volume, to the software service while the software service is running. The first process can also involve triggering the software service to switch to the stateful mode, thereby allowing the software service to write information to and read information from the persistent volume for performing various operations in a stateful way. Triggering the software service to switch between the two modes may involve, for example, updating a configuration file or a memory flag associated with the software service. Once the process is complete, the software service can operate in the stateful mode. The stateful enabler service can also execute a second process to switch the software service from the stateful mode back to the stateless mode, for example in response to detecting the same event again or a different event. The second process may involve erasing the information stored in the persistent volume, de-allocating the persistent volume from the software service, and triggering the software service to switch back to stateless mode. In this way, the stateful enabler service can dynamically switch the software service between stateful and stateless modes based on one or more events, to avoid the downtime and accommodate changing conditions or needs as described above.

In one particular example, a software service receiving requests and executing operations related to the requests may be executing in a stateful mode. The software service may store state information in a persistent volume associated with the software service. If the number of requests received per second reaches a predetermined limit, the stateful enabler service may switch the software service to a stateless mode, for example to allow the software service to handle more requests at a faster pace. Switching between these modes may involve setting or unsetting flags in a configuration file or the software service, de-allocating the persistent volume, erasing the state information stored therein, or any combination of these. The software service may include program code for accessing the persistent volume that may be enabled while the software service is executing in the stateful mode, or disabled while the software service is executing in the stateful mode. In some examples, the stateful enabler service may dynamically disable feature flags that enabled the code that allowed the software service to access the state information in the persistent volume. Feature flags can toggle the program code of the software service to hide, enable, or disable various features of the software service while the software service is running.

When the number of requests received per second falls back below the predetermined limit, the stateful enabler service may switch the software service back to the stateful mode. For example, the stateful enabler service may determine a persistent volume to be allocated to the software service by searching a lookup table including associations between the software service and available persistent volumes. The stateful enabler service may then execute an operation for causing an identified persistent volume to be allocated to the software service. The stateful enabler service may also execute an operation to dynamically set or unset flags within a configuration file or the software service. Examples of such flags can be feature flags. The feature flags can be set to enable program code that allows the software service to access and store state information in the persistent volume.

In some examples, incoming requests received by the software service while the stateful enabler service is switching the software service between the stateless mode and the stateful mode may be stored within the stateful enabler service. For example, the stateful enabler service may include a buffer (e.g., persistent volume that is separate from the persistent volume allocated to the software service). After the switch is complete, the stored requests may be forwarded from the buffer to the software service. Storing the requests within the stateful enabler service may allow the software service to switch operating modes without shutting down, which can provide a continuous user experience and prevent downtime and performance issues that may be caused by shutting down the software service.

These illustrative examples are given to introduce the reader to the general subject matter discussed here and are not intended to limit the scope of the disclosed concepts. The following sections describe various additional features and examples with reference to the drawings in which similar numerals indicate similar elements but, like the illustrative examples, should not be used to limit the present disclosure.

Figure 1:
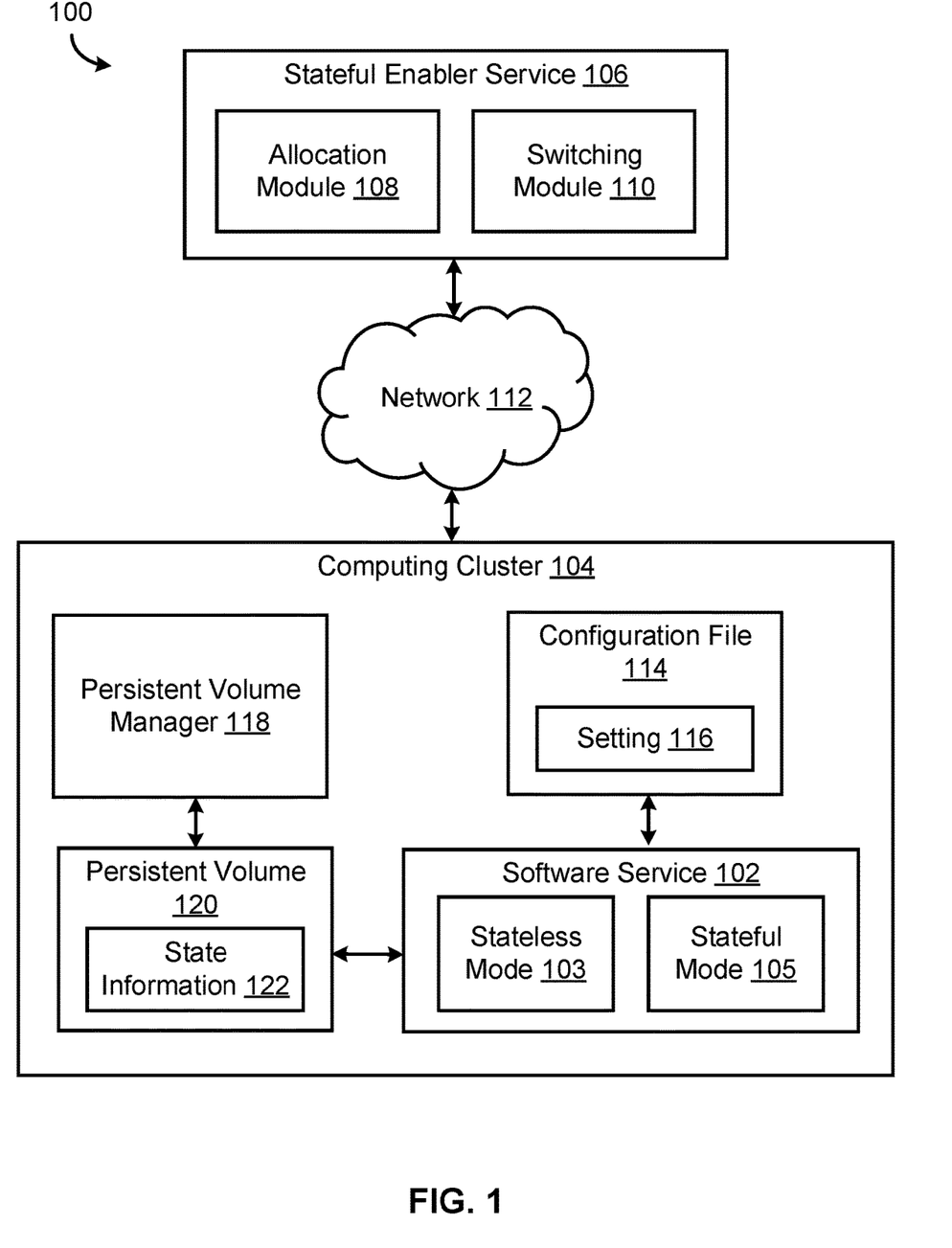
FIG. 1 is a block diagram of an example of a computing environment for switching a software service between a stateful mode and a stateless mode according to some aspects of the present disclosure.

FIG. 1 is a block diagram of an example of a computing environment 100 for switching a software service 102 between a stateful mode 105 and a stateless mode 103 according to some aspects of the present disclosure. The computing environment 100 includes a computing cluster 104 communicatively coupled to a stateful enabler service 106 via a network 112, such as a local area network or the Internet. Although the stateful enabler service 106 is depicted outside the computing cluster 104 in this example, in other examples the stateful enabler service 106 may be included in the computing cluster 104 or in any other suitable location within the computing environment 100.

The computing cluster 104 may include a network of computing nodes (e.g., hardware machines) that can execute one or more software services, such as software service 102. The software service 102 may receive incoming requests from a user of the software service 102. The requests may be for performing various functionalities of the software service 102.

In some examples, the computing cluster 104 can include a configuration file 114 associated with the software service 102. The configuration file 114 may also be stored in other locations that are accessible to the software service 102. The configuration file 114 can include one or more settings 116 that can be adjusted for switching the software service 102 between a stateful mode and a stateless mode. For example, the configuration file 114 may include a setting 116 including permissions for allowing the software service 102 to access state information.

In some examples, the computing cluster 104 can include one or more persistent volumes, such as persistent volume 120. The persistent volume 120 may be usable for storing state information 122. The state information 122 may be information associated with the current state, or context, of the software service 102. For example, state information 122 may include previous requests received from a user stored as variables, along with any information that is generated or accessed to maintain the state of the software service 102. For example, if a software service 102 is an online application that includes a shopping cart, the state information 122 may include user requests to add items to the shopping cart, the cost of each item, the time at which each item was added to the shopping cart, the login credentials for the user, the user's payment information, etc. Maintaining the state of the shopping cart may allow the software service 102 to perform operations associated with the shopping cart, such as allowing the user to purchase the items, without having to re-access the state information for every operation. A persistent volume manager 118 that can allocate the persistent volumes to the computing nodes in the computing cluster 104, for example upon request from the stateful enabler service 106 as described below.

The stateful enabler service 106 includes an allocation module 108 and a switching module 110. The stateful enabler service 106 may switch the software service 102 between operating modes (stateful mode and stateless modes) by executing the allocation module 108, the switching module 110, or both. The allocation module 108 may communicate with one or more components of the computing cluster 104, such as the persistent volume manager 118, via the network 112 to allocate or de-allocate a persistent volume 120 to the appropriate computing node running the software service 102 in the computing cluster 104. The switching module 110 may also communicate with one or more components of the computing cluster 104 via the network 112 to switch the operating mode of the software service 102. For example, the switching module 110 can transmit a communication (e.g., a command) to the software service 102 itself, or adjust the setting 116 of the configuration file 114, to switch the operating mode of the software service 102.

It will be appreciated that FIG. 1 is intended to be illustrative and non-limiting. Other examples may include more components, fewer components, different components, or a different arrangement of the components shown in FIG. 1. For instance, although the computing cluster 104 includes one persistent volume 120 and one software service 102 in the example of FIG. 1, the computing cluster 104 may have multiple software services and persistent volumes in other examples.

Figure 2:
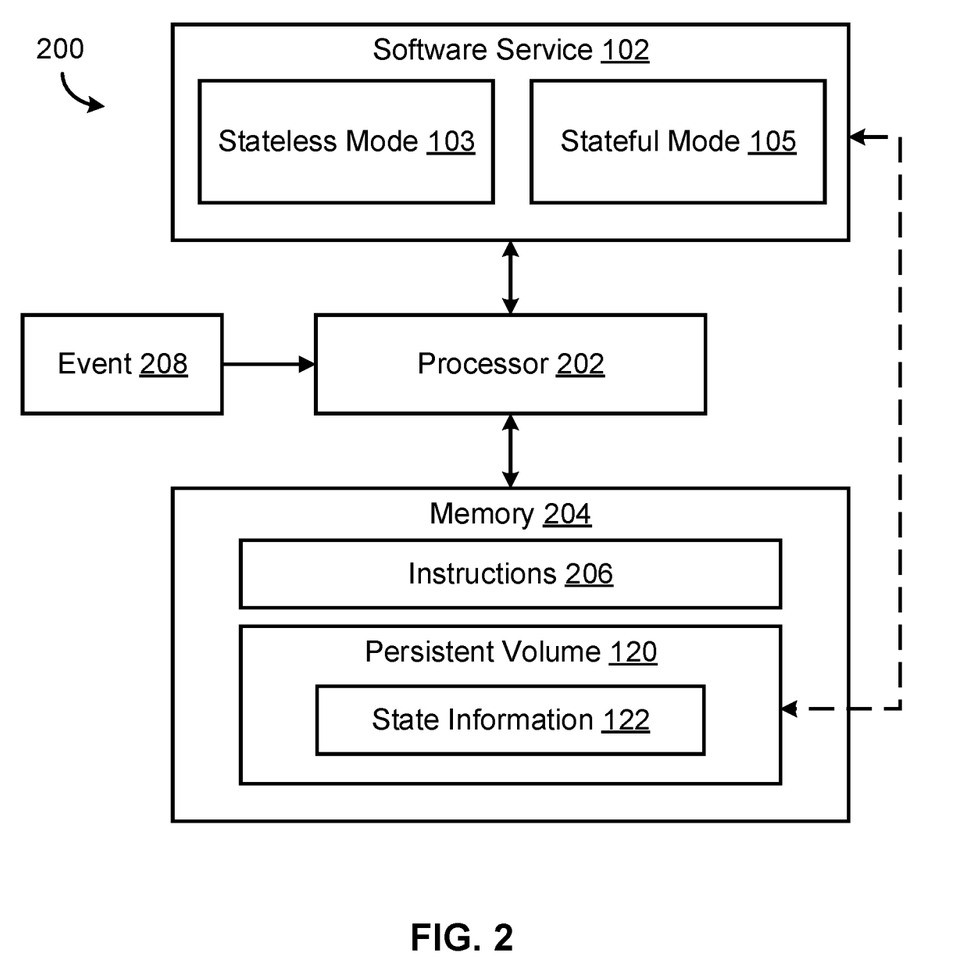
FIG. 2 is a block diagram of another example of a computing environment for switching a software service between a stateful mode and a stateless mode according to some aspects of the present disclosure.

FIG. 2 is a block diagram of another example of a computing environment 200 for switching a software service 102 between a stateful mode 105 and a stateless mode 103 according to some aspects of the present disclosure. The computing environment 200 includes a processor 202 communicatively coupled to a memory 204. In some examples, the components of the computing environment 200, such as the processor 202 and the memory 204, may be part of a same computing device. In other examples, the processor 202 and the memory 204 can be included in separate computing devices that are communicatively coupled. The computing environment 200 may also include the software service 102 that can be switched, by the processor 202, between the stateless mode 103 and the stateful mode 105.

The processor 202 can include one processor or multiple processors. Non-limiting examples of the processor 202 can include a Field-Programmable Gate Array (FPGA), an application-specific integrated circuit (ASIC), and a microprocessor. The processor 202 can execute instructions 206 stored in the memory 204 to perform computing operations. In some examples, the instructions 206 can include processor-specific instructions generated by a compiler or an interpreter from code written in any suitable computer-programming language, such as C, C++, C#, etc.

The memory 204 can include one memory or multiple memories. The memory 204 can be non-volatile and may include any type of memory that retains stored information when powered off. Non-limiting examples of the memory 204 include electrically erasable and programmable read-only memory (EEPROM), flash memory, or any other type of non-volatile memory. At least some of the memory 204 can include a non-transitory computer-readable medium from which the processor 202 can read instructions 206. A computer-readable medium can include electronic, optical, magnetic, or other storage devices capable of providing the processor 202 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 206. In some examples, the instructions 206 may correspond to the stateful enabler service 106 described in FIG. 1. The memory 204 may also include persistent volume 120 that may store state information 122 for the software service 102 when the software service 102 is in its stateful mode 105.

In some examples, the processor 202 can execute the instructions 206 to perform some or all of the functionality described herein. For example, the software service 102 may be executing in a stateless mode 103. The processor 202 can detect an event 208 prompting the software service 102 to transition from a stateless mode 103 to a stateful mode 105. For example, the processor 202 may monitor operating conditions in the computing cluster 104 to detect the event 208. Examples of such an event 208 may include the amount of available memory or processing power in the computing cluster 104 falling below a threshold level, the amount of latency associated with the computing cluster 104 increasing above a threshold level, or any combination of these. Additionally or alternatively, the processor 202 may analyze operating metrics for the software service 102 to detect an event 208. Examples of such an event 208 may include the amount of memory or processing power consumed by the software service 102 exceeding a threshold level, the amount of latency associated with the software service 102 increasing above a threshold level, or any combination of these. Additionally or alternatively, the processor 202 may receive messages indicating the event 208 from components of the computing cluster 104 such as a messaging bus. In response to detecting the event 208, the processor 202 may execute the allocation module 108 to allocate a persistent volume 120 for storing state information 122 to the software service 102. The processor 202 may also execute the switching module 110 for switching the software service 102 to a stateful mode 105, thereby allowing the software service 102 to read and write the state information 122 in the persistent volume 120.

Figure 3:
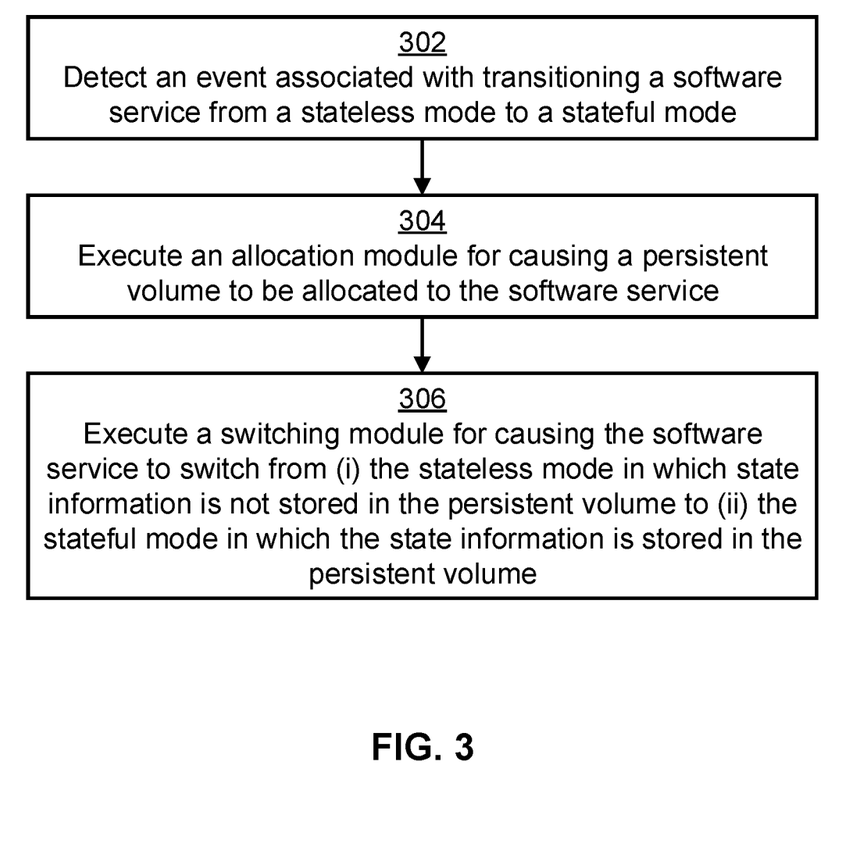
FIG. 3 is a flow chart of an example of a process for switching a software service from a stateless mode to a stateful mode according to some aspects of the present disclosure.
Figure 4:
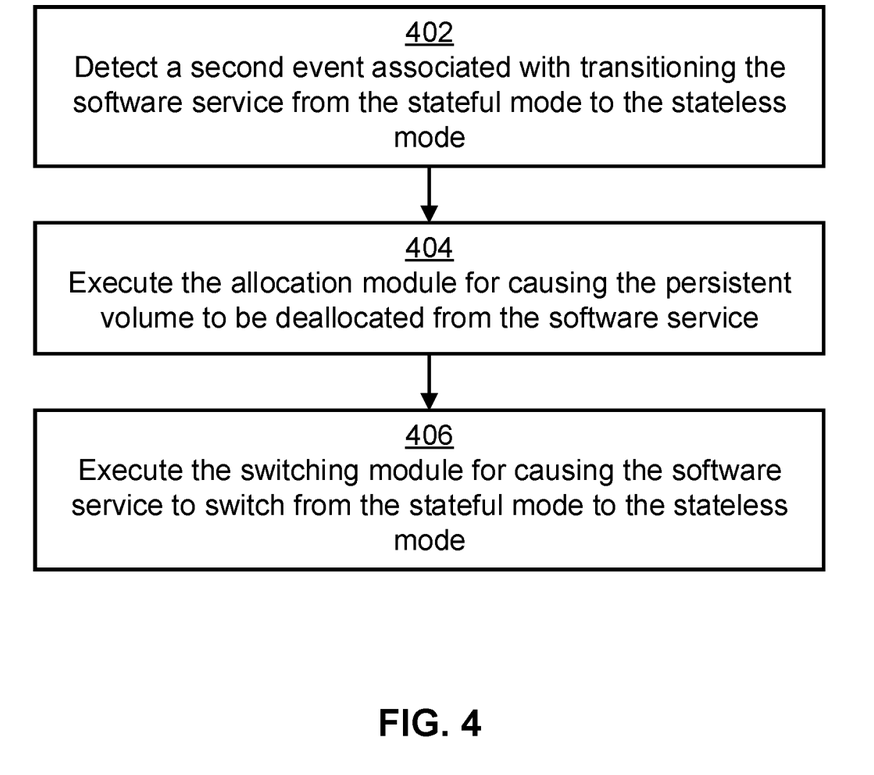
FIG. 4 is a flow chart of an example of a process for switching a software service from a stateful mode to a stateless according to some aspects of the present disclosure.

In some examples, the processor 202 can implement some or all steps shown in FIGS. 3-4. Other examples can include more steps, fewer steps, different steps, or a different order of the steps than is shown in FIGS. 3-4. The steps of FIGS. 3-4 are discussed below with reference to the components discussed above in relation to FIGS. 1-2.

Referring now to FIG. 3, at block 302, the processor 202 detects an event 208 associated with transitioning a software service 102 from a stateless mode 103 to a stateful mode 105. For example, the event 208 may be an incoming request from a user of the software service 102 to store authentication information, such as a username and password. The processor 202 may transition the software service 102 to the stateful mode 105 to store the username and password, thus allowing the user to continue to access the software service 102 without having to re-enter authentication information.

At block 304, the processor 202 executes an allocation module 108 for causing a persistent volume 120 to be allocated to the software service 102. The processor 202 can execute the allocation module 108 in response to detecting the event 208. Allocating the persistent volume 120 the software service 102 may involve making the persistent volume 120 accessible to the software service 102, for example by virtually attaching the persistent volume 120 to the host (e.g., the physical or virtual machine) running the software service 102. The allocation module 108 can directly or indirectly allocate the persistent volume 120 to the software service 102. For example, the allocation module 108 can communicate with a persistent volume manager 118 via the network 112 to cause the persistent volume manager 118 to allocate the persistent volume 120 to the software service 102.

At block 306, the processor 202 executes a switching module 110 for causing the software service 102 to switch from (i) the stateless mode 103 in which the state information 122, such as authentication information, is not stored in the persistent volume 120 to (ii) the stateful mode 105 in which the state information 122 is stored in the persistent volume 120. The processor 202 can execute switching module 110 in response to detecting the event 208. The switching module 110 can directly or indirectly switch the software service 102 from the stateless mode 103 to the stateful mode 105. For example, the switching module 110 can adjust, via the network 112, a setting 116 in a configuration file 114 associated with the software service 102. Adjusting the setting 116 may enable the stateful mode 105 of operation or may allow the software service 102 to access the persistent volume 120 for use in the stateful mode 105. As another example, the switching module 110 can transmit a communication with a switching command to the software service 102, which can be preprogrammed to receive the switching command and responsively switch between the modes. In some examples, the switching module 110 may receive a predefined set of instructions, such as an Ansible playbook, from any suitable source. The predefined set of instructions may be received prior to, concurrently with, or subsequent to detecting the event 208. The predefined set of instructions can include a series of operations executable by the switching module 110 to switch the software service 102 from the stateless mode 103 to the stateful mode 105. The switching module 110 can receive the predefined set of instructions and execute the predefined set of instructions to switch the software service 102 from the stateless mode 103 to the stateful mode 105.

In some examples, the processor 202 may execute the allocation module 108 and the switching module 110 while the software service 102 is running, causing the software service 102 to switch from the stateless mode 103 to the stateful mode 105 while the software service 102 is running.

This may allow for a dynamic change in the operational mode of the software service 102 from the stateless mode 103 to the stateful mode 105 to account for changes to the operating characteristics (e.g., resource consumption) of the system or the software service 102.

In some examples, the processor 202 may prevent requests from being transmitted to the software service 102 while the software service 102 is switching from the stateless mode 103 to the stateful mode 105. For example, the processor 202 may cause incoming requests from users to be paused or rerouted while the software service 102 is transitioning. In some such examples, incoming requests may be buffered or otherwise stored within the stateful enabler service 106 or other component of the system, until the processor 202 determines that the transition is complete. After determining that the transition to the stateful mode 105 is complete, the processor 202 may allow the software service 102 to start receiving incoming requests again. If the incoming requests during the transition were buffered or otherwise stored, the processor 202 may transmit the stored requests to the software service 102 for handling.

FIG. 4 is a flow chart of an example of a process for switching a software service 102 from a stateful mode 105 to a stateless mode 103 according to some aspects of the present disclosure. At block 402, the processor 202 detects a second event associated with transitioning the software service 102 from the stateful mode 105 to the stateless mode 103. The second event may be of the same type as, or may be of a different type from, the first event 208. For example, the second event may be an incoming request from a user of the software service 102 to remove their authentication information.

At block 404, the processor 202 executes the allocation module 108 for causing the persistent volume 120 to be deallocated from the software service 102. The processor 202 can execute the allocation module 108 in response to detecting the second event. The allocation module 108 can directly or indirectly deallocate the persistent volume 120 from the software service 102. Deallocating the persistent volume 120 the software service 102 may involve making the persistent volume 120 inaccessible to the software service 102, for example by virtually detaching the persistent volume 120 from the host running the software service 102. In some examples, the allocation module 108 may also erase the state information 122 from the persistent volume 120, remove the persistent volume 120 from the computing cluster 104 hosting the software service 102, or both these. Additionally or alternatively, the processor 202 may execute the allocation module 108 to copy or transfer the state information 122 to a separate memory storage that is not accessible by the software service 102. In other examples, the processor 202 may execute the allocation module 108 to communicate with a persistent volume manager (e.g., the persistent volume manager 118 of FIG. 1) to perform some or all of the operations described above.

At block 406, the processor 202 executes the switching module 110 for causing the software service 102 to switch from the stateful mode 105 to the stateless mode 103. The processor 202 can execute the switching module 110 in response to detecting the second event. The switching module 110 can directly or indirectly switch the software service 102 from the stateful mode 105 to the stateless mode 103. In some examples, the processor 202 may execute the switching module 110 to adjust, via the network 112, a setting 116 in a configuration file 114 associated with the software service 102. Adjusting the setting 116 may disable the stateful mode 105 of operation or may disable access the persistent volume 120. Alternatively or additionally, the switching module 110 may receive a second predefined set of instructions, such as an Ansible playbook, from any suitable source. The second predefined set of instructions may be different from the first predefined set of instructions described above with respect to block 306. The second predefined set of instructions may be received prior to, concurrently with, or subsequent to detecting the second event. The second predefined set of instructions can include a series of operations executable by the switching module 110 to switch the software service 102 from the stateful mode 105 to the stateless mode 103. The switching module 110 can receive the second predefined set of instructions and execute the second predefined set of instructions to switch the software service 102 from the stateful mode 105 to the stateless mode 103 (e.g., while the software service 102 is running).

In some examples, the processor 202 may prevent requests from being transmitted to the software service 102 while the processor 202 is transitioning from the stateful mode 105 to the stateless mode 103. For example, the processor 202 may cause incoming requests from users to be paused or rerouted while the software service 102 is transitioning. In some such examples, incoming requests may be buffered or otherwise stored within the stateful enabler service 106 or other component of the system until the processor 202 determines that the transition is complete. After determining that the transition to the stateful mode 105 is complete, the processor 202 may allow the software service 102 to start receiving incoming requests again. If the incoming requests during the transition were buffered or otherwise stored, the processor 202 may transmit the stored requests to the software service 102 for handling.

In some examples, a first instance of the software service 102 can be switched from a stateful mode 105 to a stateless mode 103. During or after this process, the processor 202 may execute the allocation module 108 to cause the persistent volume 120, which includes the stored state information 122 from the first instance, to be allocated to a second instance of the software service 102. The second instance of the software service 102 may execute separately from the first instance of the software service 102. If the second instance is not already in the stateful mode 105, the processor 202 may execute the switching module 110 to switch the second instance of the software service 102 to the stateful mode 105. When in the stateful mode 105, the second instance can be allowed to access the state information 122 stored in the persistent volume 120 by the first instance of the software service 102. In this way, the state information 122 can be shared between two instances of the software service 102. The second instance may then add, remove, or update the state information 122. At a later point in time (e.g., if the first instance is switched back to the stateful mode 105), the updated state information 122 may then be passed back to the first instance by executing the reverse of this process.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

What is claimed is:

1. A non-transitory computer-readable medium comprising program code that is executable by a processor for causing the processor to:
   detect an event associated with transitioning a software service from a stateless mode to a stateful mode;
   in response to detecting the event:
      execute an allocation module for causing a persistent volume to be allocated to the software service; and
      execute a switching module for causing the software service to switch from (i) the stateless mode in which state information is not stored in the persistent volume to (ii) the stateful mode in which the state information is stored in the persistent volume;
   pause requests from being transmitted to the software service while the software service is undergoing a transition from the stateless mode to the stateful mode;
   route the requests to a destination other than the software service while the software service is undergoing the transition from the stateless mode to the stateful mode, wherein the destination is a buffer; and
   based on determining that the transition is complete:
      extract the requests from the buffer and transmit the requests to the software service; and
      allow additional requests to be transmitted to the software service.

2. The non-transitory computer-readable medium of claim 1, wherein the switching module is configured to cause the software service to switch from the stateless mode to the stateful mode by adjusting a setting of a configuration file associated with the software service.

3. The non-transitory computer-readable medium of claim 1, wherein the switching module is configured to cause the software service to switch from the stateless mode to the stateful mode by transmitting a communication over a network to the software service.

4. The non-transitory computer-readable medium of claim 1, wherein the allocation module is configured to cause the persistent volume to be allocated to the software service by communicating with a persistent volume manager that is separate from the software service.

5. The non-transitory computer-readable medium of claim 1, further comprising program code that is executable by the processor to execute the allocation module and the switching module while the software service is running to dynamically switch the software service from the stateless mode to the stateful mode while the software service is running.

6. The non-transitory computer-readable medium of claim 1, wherein the event is a first event, and further comprising program code that is executable by the processor to:
   detect a second event associated with transitioning the software service from the stateful mode to the stateless mode; and
   in response to detecting the second event:
      execute the allocation module for causing the persistent volume to be deallocated from the software service; and
      execute the switching module for causing the software service to switch from the stateful mode to the stateless mode.

7. The non-transitory computer-readable medium of claim 6, further comprising program code that is executable by the processor to, based on causing the software service to switch from the stateful mode to the stateless mode, erase the state information from the persistent volume.

8. The non-transitory computer-readable medium of claim 6, further comprising program code that is executable by the processor to, based on causing the software service to switch from the stateful mode to the stateless mode, remove the persistent volume from a computing node hosting the software service.

9. The non-transitory computer-readable medium of claim 6, further comprising program code that is executable by the processor to dynamically switch the software service from the stateful mode to the stateless mode while the software service is running.

10. The non-transitory computer-readable medium of claim 6, further comprising program code that is executable by the processor to:
    prevent requests from being transmitted to the software service while the software service is undergoing a transition from the stateful mode to the stateless mode;
    determine that the transition is complete; and
    based on determining that the transition is complete, allow the requests to be transmitted to the software service.

11. The non-transitory computer-readable medium of claim 6, wherein the software service is a first instance of the software service, and further comprising program code that is executable by the processor to, subsequent to causing the software service to switch from the stateful mode to the stateless mode:
    execute the allocation module for causing the persistent volume to be allocated to a second instance of the software service to share the state information stored in the persistent volume with the second instance; and
    execute the switching module for causing the second instance to engage the stateful mode and use the state information stored in the persistent volume.

12. A method comprising:
    detecting, by a processor, an event associated with transitioning a software service from a stateless mode to a stateful mode;
    in response to detecting the event:
       causing, by the processor, a persistent volume to be allocated to the software service; and
       causing, by the processor, the software service to switch from (i) the stateless mode in which state information is not stored in the persistent volume to (ii) the stateful mode in which the state information is stored in the persistent volume,
    pausing, by the processor, requests from being transmitted to the software service while the software service is undergoing a transition from the stateless mode to the stateful mode;
    routing, by the processor, the requests to a destination other than the software service while the software service is undergoing the transition from the stateless mode to the stateful mode, wherein the destination is a buffer;
    determining, by the processor, that the transition is complete; and
    based on determining that the transition is complete:
       extracting, by the processor, the requests from the buffer and transmitting the requests to the software service; and
       allowing, by the processor, additional requests to be transmitted to the software service.

13. The method of claim 12, further comprising transitioning from the stateless mode to the stateful mode by adjusting a setting of a configuration file associated with the software service.

14. The method of claim 12, further comprising dynamically switching the software service from the stateless mode to the stateful mode while the software service is running.

15. The method of claim 12, further comprising:
    detecting a second event associated with transitioning the software service from the stateful mode to the stateless mode; and
    in response to detecting the second event:
        causing the persistent volume to be deallocated from the software service; and
        causing the software service to switch from the stateful mode to the stateless mode.

16. The method of claim 15, further comprising, based on causing the software service to switch from the stateful mode to the stateless mode, removing the persistent volume from a computing node hosting the software service.

17. The method of claim 15, wherein the software service is a first instance of the software service, and further comprising:
    causing the persistent volume to be allocated to a second instance of the software service to share the state information stored in the persistent volume with the second instance; and
    causing the second instance to engage the stateful mode and use the state information stored in the persistent volume.

18. A system comprising:
    a processor; and
    a non-transitory computer-readable memory including instructions that are executable by the processor for causing the processor to:
        detect an event associated with transitioning a software service from a stateless mode to a stateful mode;
        in response to detecting the event:
            cause a persistent volume to be allocated to the software service; and
            cause the software service to switch from (i) the stateless mode in which state information is not stored in the persistent volume to (ii) the stateful mode in which the state information is stored in the persistent volume;
        pause requests from being transmitted to the software service while the software service is undergoing a transition from the stateless mode to the stateful mode;
        route the requests to a destination other than the software service while the software service is undergoing the transition from the stateless mode to the stateful mode, wherein the destination is a buffer;
        determine that the transition is complete; and
        based on determining that the transition is complete:
            extract the requests from the buffer and transmit the requests to the software service; and
            allow additional requests to be transmitted to the software service.

19. The system of claim 18, wherein the software service is a first instance of the software service, and wherein the instructions further comprise program code that is executable by the processor for causing the processor to:
    cause the persistent volume to be allocated to a second instance of the software service to share the state information stored in the persistent volume with the second instance; and
    cause the second instance to engage the stateful mode and use the state information stored in the persistent volume.

20. The system of claim 18, wherein the instructions further comprise program code that is executable by the processor for causing the processor to:
    detect a second event associated with transitioning the software service from the stateful mode to the stateless mode; and
    in response to detecting the second event:
        cause the persistent volume to be deallocated from the software service; and
        cause the software service to switch from the stateful mode to the stateless mode.

* * * * *